US011551032B1

(12) United States Patent
Gebhardt et al.

(10) Patent No.: US 11,551,032 B1
(45) Date of Patent: Jan. 10, 2023

(54) MACHINE LEARNING BASED AUTOMATED OBJECT RECOGNITION FOR UNMANNED AUTONOMOUS VEHICLES

(71) Applicant: THE UNITED STATES OF AMERICA AS REPRESENTED BY THE SECRETARY OF THE NAVY, San Diego, CA (US)

(72) Inventors: Daniel J. Gebhardt, San Diego, CA (US); Keyur N. Parikh, San Diego, CA (US); Iryna P. Dzieciuch, San Diego, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 1132 days.

(21) Appl. No.: 15/920,739

(22) Filed: Mar. 14, 2018

(51) Int. Cl.
*G06K 9/62* (2022.01)
*B63G 8/00* (2006.01)
(Continued)

(52) U.S. Cl.
CPC ........... *G06K 9/6256* (2013.01); *B63G 8/001* (2013.01); *G01S 5/0018* (2013.01); *G01S 15/89* (2013.01);
(Continued)

(58) Field of Classification Search
CPC .......... G06N 20/00; G06N 3/08; G06N 7/023; G06N 3/0454; G06N 3/02;
(Continued)

(56) References Cited

U.S. PATENT DOCUMENTS

| 5,937,078 A | * | 8/1999 | Hyland | G06V 10/443 |
| | | | | 382/103 |
| 6,052,485 A | * | 4/2000 | Nelson | G06K 9/3241 |
| | | | | 382/225 |
| 9,092,866 B1 | * | 7/2015 | Li | G06V 20/647 |

(Continued)

OTHER PUBLICATIONS

Zerr B, Stage B, Guerrero A. Automatic target classification using multiple sidescan sonar images of different orientations. NATO, SACLANT Undersea Research Centre; Sep. 1, 1997. (Year: 1997).*

(Continued)

*Primary Examiner* — Clifford Hilaire
(74) *Attorney, Agent, or Firm* — Naval Information Warfare Center, Pacific; Kyle Eppele; Matthew D. Pangallo

(57) ABSTRACT

A platform is positioned within an environment. The platform includes an image capture system connected to a controller implementing a neural network. The neural network is trained to associate visual features within the environment with a target object utilizing a known set of input data examples and labels. The image capture system captures input images from the environment and the neural network recognizes features of one or more of the input images that at least partially match one or more of the visual features within the environment associated with the target object. The input images that contain the visual features within the environment that at least partially match the target object are labeled, a geospatial position of the target object is determined based upon pixels within the labeled input images, and a class activation map is generated, which is then communicated to a supervisory system for action.

11 Claims, 5 Drawing Sheets

(51) Int. Cl.
*G01S 5/00* (2006.01)
*G06T 7/136* (2017.01)
*G01S 15/89* (2006.01)

(52) U.S. Cl.
CPC .............. *G06K 9/623* (2013.01); *G06T 7/136* (2017.01); *B63G 2008/002* (2013.01); *G06T 2207/20081* (2013.01)

(58) Field of Classification Search
CPC ............. G06T 2207/20081; G06T 7/70; G06T 2207/20084
See application file for complete search history.

(56) References Cited

U.S. PATENT DOCUMENTS

| | | | | |
|---|---|---|---|---|
| 2002/0038307 | A1* | 3/2002 | Obradovic | G06K 9/6253 |
| 2004/0165478 | A1* | 8/2004 | Harmon, Jr. | G01S 7/539 367/87 |
| 2009/0252424 | A1* | 10/2009 | Mine | G06V 20/13 382/224 |
| 2016/0012472 | A1* | 1/2016 | Nagaswami | G06Q 30/0265 705/14.62 |
| 2018/0174454 | A1* | 6/2018 | Tiwaree | G06Q 40/12 |
| 2018/0336683 | A1* | 11/2018 | Feng | G06V 10/44 |
| 2019/0033447 | A1* | 1/2019 | Chan | G01S 7/539 |
| 2019/0113917 | A1* | 4/2019 | Buch | B60W 60/0011 |
| 2020/0349362 | A1* | 11/2020 | Maloney | G05D 1/0246 |

OTHER PUBLICATIONS

Zhou B, Khosla A, Lapedriza A, Oliva A, Torralba A. Learning deep features for discriminative localization. InProceedings of the IEEE conference on computer vision and pattern recognition 2016 (pp. 2921-2929). (Year: 2016).*

Hyland JC, Dobeck GJ. Sea mine detection and classification using side-looking sonar. InDetection Technologies for Mines and Mine-like Targets Jun. 20, 1995 (vol. 2496, pp. 442-453). International Society for Optics and Photonics. (Year: 1995).*

Guo S, Chen S, Li Y. Face recognition based on convolutional neural network and support vector machine. In2016 IEEE International conference on Information and Automation (ICIA) Aug. 1, 2016 (pp. 1787-1792). IEEE. (Year: 2016).*

Coşkun M, Uçar A, Yildirim Ö, Demir Y. Face recognition based on convolutional neural network. In2017 International Conference on Modern Electrical and Energy Systems (MEES) Nov. 15, 2017 (pp. 376-379). IEEE. (Year: 2017).*

Chen J, Summers JE. Deep convolutional neural networks for semi-supervised learning from synthetic aperture sonar (SAS) images. InProceedings of Meetings on Acoustics 173EAA Jun. 25, 2017 (vol. 30, No. 1, p. 055018). Acoustical Society of America. (Year: 2017).*

Selvaraju RR, Das A, Vedantam R, Cogswell M, Parikh D, Batra D. Grad-CAM: Why did you say that?. arXiv preprint arXiv:1611.07450. Nov. 22, 2016. (Year: 2016).*

Simonyan, K. et al. "Very Deep Convolutional Networks for Laarge-Scale Image Recognition", arXiv:1409.1556 [cs. CV], pp. 1-14, 2015.

Lin, M. et al., "Network in Network", arXiv:1312.4400v3 [cs.NE], pp. 1-10, 2014.

Gebhardt, D. et al, "Convolutional Neural Network on Embedded Linux System-on-Chip", Technical Report 3010, SSC Pacific, pp. 1-11, 2016.

Gildenblat, J., "Class activation maps in Keras for visualizing where deep learning networks pay attention", available at https://jacobgil.github.io/deeplearning/class-activation-maps, Jan. 22, 2018.

Dzieciuch, I., et al, "Non-linear Convolutional Neural Network for Automatic Detection of Mine-Like Objects in Sonar Imagery", Proceedings of the 4th Int. Conf. on Applications in Non-linear Dynamics (ICAND 2016), pp. 309-314, first online Mar. 23, 2017.

Reed, S. et al. "An automatic approach to the detection and extraction of mine features in sidescan sonar", IEEE Journal of Oceanic Engineering, vol. 28, No. 1, pp. 90-105, 2003.

Dura, E., et al., "Active learning for detection of mine-like objects in side-scan sonar imagery", IEEE Journal of Oceanic Engineering, vol. 30, No. 2, pp. 360-371, 2005.

Barngrover, C. et al., "A braincomputer interface (bci) for the detection of mine-like objects in sidescan sonar imagery," IEEE Journal of Oceanic Engineering, vol. 41, No. 1, pp. 123-138, Jan. 2016.

Gebhardt, D. et al., "Hunting for naval mines with deep neural networks", IEEE Oceans 2017, pp. 1-5 Sep. 18-21, 2017.

Sinai, A. et al., "Mine-like objects detection in side-scan sonar images using a shadows-highlights geometrical features space", Oceans 2016 MTS/IEEE, Monterey, pp. 1-6, Sep. 2016.

Barngrover, C. et al., "Semisynthetic versus real-world sonar training data for the classification of mine-like objects," IEEE Journal of Oceanic Engineering, vol. 40, No. 1, pp. 48-56, Jan. 2015.

Zhou, B. et al., "Learning deep features for discriminative localization", CoRR, vol. abs/1512.04150, Dec. 2015, available online at http://arxiv.org/abs/1512.04150.

* cited by examiner

400

| Ident. | Layer Desc. |
|---|---|
| L1 | c16-gap-fc2 |
| L2 | c16-c16-gap-fc2 |
| L3 | c16-c16-mp-c32-gap-fc2 |
| L4 | c16-c16-mp-c32-c32-gap-fc2 |
| L5 | c16-c16-mp-c32-c32-mp-c64-gap-fc2 |
| L6 | c16-c16-mp-c32-c32-mp-c64-c64-gap-fc2 |
| L7 | c16-c16-mp-c32-c32-mp-c64-c64-c128-gap-fc2 |
| L8 | c16-c16-mp-c32-c32-mp-c64-c64-c128-c128-gap-fc2 |
| L9 | c16-c16-mp-c32-c32-mp-c64-c64-c128-c128-c256-gap-fc2 |

# MACHINE LEARNING BASED AUTOMATED OBJECT RECOGNITION FOR UNMANNED AUTONOMOUS VEHICLES

FEDERALLY SPONSORED RESEARCH AND DEVELOPMENT

This invention is assigned to the United States Government. Licensing inquiries may be directed to Office of Research and Technical Applications, Space and Naval Warfare Systems Center, Pacific, Code 72120, San Diego, Calif., 92152; telephone (619) 553-5118; email: ssc_pac_t2@navy.mil. Reference Navy Case No. 107522.

BACKGROUND

Object recognition from imagery often relies on highly trained operators to perform careful imagery analysis for hours at a time. Existing techniques to automate this process are based on traditional computer vision algorithms and rely on standard image enhancing methods such as contrast adjustment, brightness adjustment, Fast Fourier Transform methods, etc. However, these methods are not typically accurate enough to replace a human operator and allow for an automated system that can be used in unique domains, such as an underwater environment. There is a need for an improved unmanned autonomous system that can detect and classify specific objects as targets of interest in environments including an underwater environment.

DETAILED DESCRIPTION OF SOME EMBODIMENTS

Figure 1:
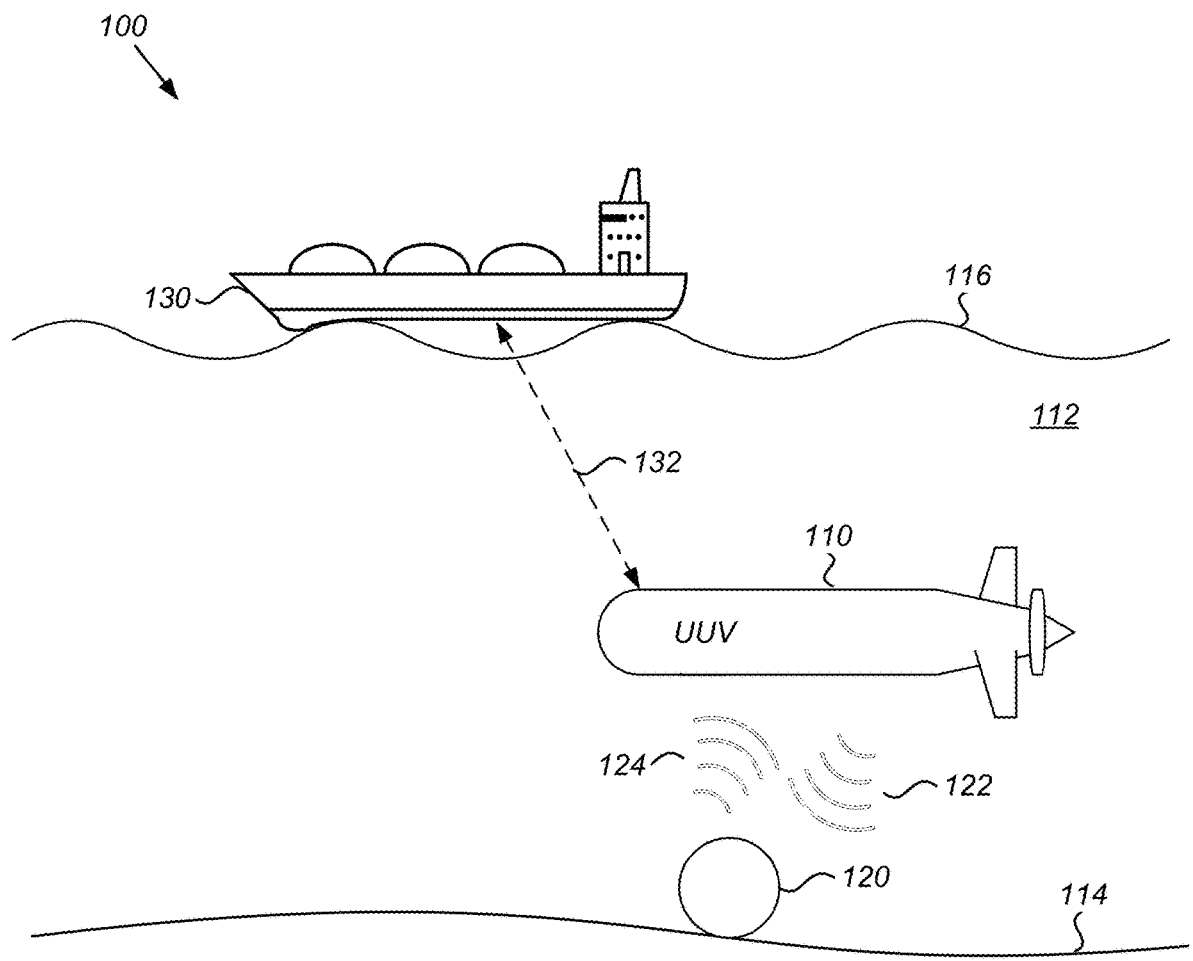
FIG. 1 shows a diagram illustrating an overview of the operation of an embodiment of the systems and methods disclosed herein.

Reference in the specification to "one embodiment" or to "an embodiment" means that a particular element, feature, structure, or characteristic described in connection with the embodiments is included in at least one embodiment. The appearances of the phrases "in one embodiment", "in some embodiments", and "in other embodiments" in various places in the specification are not necessarily all referring to the same embodiment or the same set of embodiments.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or.

Additionally, use of the "a" or "an" are employed to describe elements and components of the embodiments herein. This is done merely for convenience and to give a general sense of the invention. This detailed description should be read to include one or at least one and the singular also includes the plural unless it is obviously meant otherwise.

As used herein, the terms "about" and "approximately" generally mean plus or minus 10% of the value stated.

The disclosed embodiments involve systems and methods that may be used to recognize the presence of particular objects of interest, or targets, using an unmanned autonomous vehicle. The systems use an automatic target recognition image processing algorithm that identifies objects within an image and provides visual feedback to a supervisory entity (human operator or other automated system) regarding the location of objects. As an example, the system may be configured with the appropriate algorithms to locate various objects underwater, such as shipwrecks, sea life, and explosive mines. However, as a broadly-applicable technology, the disclosed methodology may be applied to many different domains including image and video processing for homeland security, maritime security-ray screening, medical imaging MM, microscopy, and cellular or protein imaging to be used for cancer screening.

The disclosed systems and methods are advantageous in that the disclosed approach is data-driven and requires only examples of the target objects which should be identified, allowing it to be used for a variety of purposes. The approach also reduces the need for preprocessing input—the algorithm learns to ignore features that are otherwise distractions for other methodology types, and thus fewer image preprocessing steps are required. This is in contrast to traditional automated target recognition (ATR) approaches that utilize specific features identified by an engineer, such as match filters. Further, in some embodiments the approach involves identifying a computationally-efficient deep neural network (DNN) that can perform inference, or target identification without model training, in real-time utilizing the vehicle's on-board computational resources. Unlike other DNN approaches based on "transfer learning", the disclosed approach trains the minimal network size specifically for the target of interest, which enables it to be used on less computationally-capable hardware.

Additionally, the approach provides advantages for visualization of target detections. While other methods provide bounding-boxes, the disclosed systems and methods provide a pixel-level representation of the importance of that particular pixel, which is a more information-rich approach. Still further, the systems and methods disclosed are beneficial in that the processing is performed on the unmanned vehicle, which significantly reduces the bandwidth required for communication of the detection results between the unmanned vehicle and the supervisory system.

FIG. 1 shows a diagram 100 illustrating an overview of the operation of an embodiment of the systems and methods disclosed herein. As shown, unmanned underwater vehicle (UUV) 110 is configured to operate within an underwater environment 112. It should be noted however, that in a different operating environment (e.g. air-based) a differently configured unmanned vehicle (UV) or autonomous vehicle may be used that is configured to operate in such operating environment. UUV 110 is configured to detect an object 120 located on seafloor 114 by sending a signal 122 towards object 120 and detecting a received signal 124 that represents signal 122 reflected off of object 120. As an example, signal 122 may be generated by use of a side-scan sonar device, which produces images based upon received signal 124 that are processed by UUV 110. After such images are processed, UUV 110 transmits results to vessel 130, which is located on water surface 116, via a communication signal 132. In some embodiments, vessel 130 is a supervisory system for UUV 110, whereas in other embodiments vessel 130 may be any vessel with which UUV 110 is configured to communicate.

Figure 2:
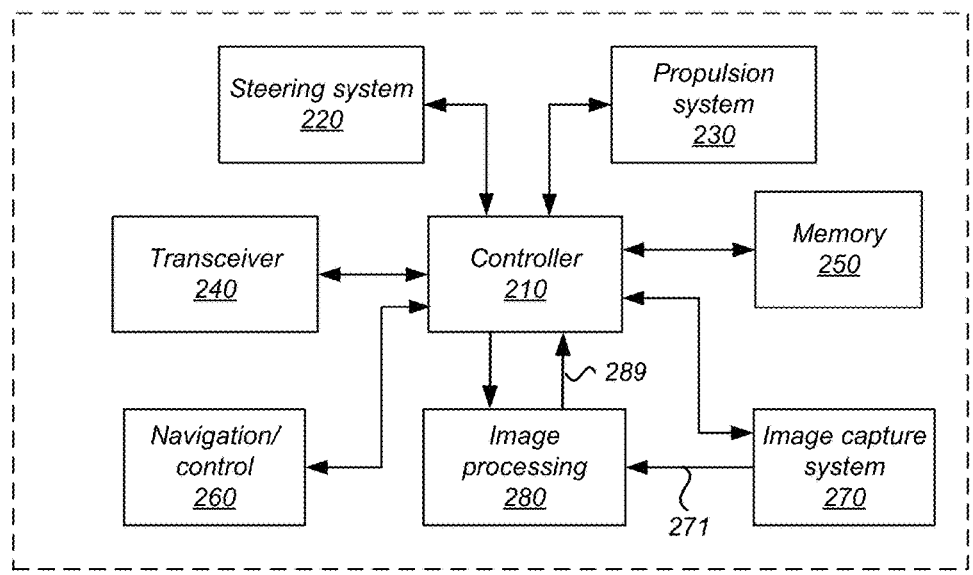
FIG. 2 shows a component diagram of an embodiment of an unmanned vehicle that may be used in accordance with the system and methods disclosed herein.

An example component configuration that may be used for UUV 110 is shown in FIG. 2. As shown in FIG. 2, system 200 includes a controller 210 which is operatively connected to steering system 220, propulsion system 230, transceiver 240, memory 250, navigation/control module 260, an image capture system 270, and an image processing module 280. Controller 210 includes the appropriate software and/or circuitry to allow for UUV 110 or other UV to perform the functions as shown and described herein. Image processing module 280 contains the automatic target recognition system, composed of a machine learning model such as a DNN and a communication capability to inform the controller 210 where detected targets occur on the seafloor. It should be noted that system 200 may be used in other systems/vehicles besides a UUV, such as a land-based or air-based system.

As an example, when system 200 is configured to be used on a UUV in an underwater environment, image capture system 270 may be a sonar system. In some embodiments, image capture system 270 may comprise another system that is used to capture input, such as a video camera, radar, or other sensor system. As would be recognized by a person having ordinary skill in the art, depending upon the image capture system 270 used, image processing module 280 would be specifically tailored to process the input produced by the particular image capture system 270 used.

Figure 3:
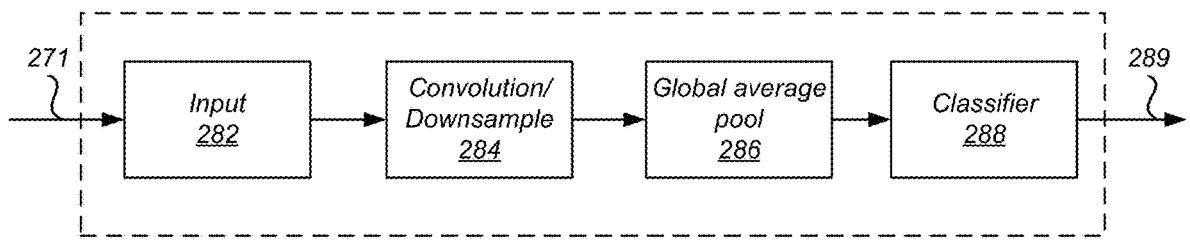
FIG. 3 shows a diagram of an embodiment of the image processing module contained within an unmanned vehicle in accordance with the system and methods disclosed herein.

FIG. 3 shows a diagram of an embodiment of the image processing module 280 that may be used within UUV 110. As shown, input signal 271 is received into an input module 282. Input module is configured with the appropriate software or hardware to process input signal 271 into an image representation that reflects the nature of the UUV's physical environment. As noted above, the specific hardware/software will be dependent upon the particular image capture system 270 used.

The output of input module 282 is directed to the input of the ATR module created from a particular machine learning model. In this example, it is a DNN with layers of convolution filters or down sampling, represented by module 284. It should be noted however, that other configurations for machine learning modules may be used within image processing module 280, such as a recurrent neural network (RNN) model, convolutional neural network (CNN) model, or other module. Module 284 is configured with the appropriate software or hardware to produce feature maps of the input that aid a classifier in determining if a target object is present; for a CNN, these are repeated applications of convolutional filters and down sampling. In some embodiments, the neural network includes at least one layer of convolutional filters and a classifier.

The output of module 284 is input into global average pool module 286. Global average pool module 286 is configured with appropriate software to transform each feature map into a single value, which is the output of global average pool module 286. The output of global average pool module 286 is input into classifier 288 that is commonly of the type softmax. It should be noted that other types of classifiers 288 may be implemented into image processing module 280. Classifier 288 is configured with the appropriate software to make a decision if the input 271 is a target of interest, and if so, what type of target it is. Various types of classifiers may be used as known by those having ordinary skill in the art. The output of classifier 288, signal 289, is used as input by controller 210 that may be used to direct other systems within system 200 based on the information contained in signal 289. Controller 210 may also direct signal 289 through transceiver 240 to one or more systems within vessel 130, where vessel 130 may use such signal for various purposes including, but not limited to, re-routing the path of the UUV to further examine a target object of interest.

Figure 4:
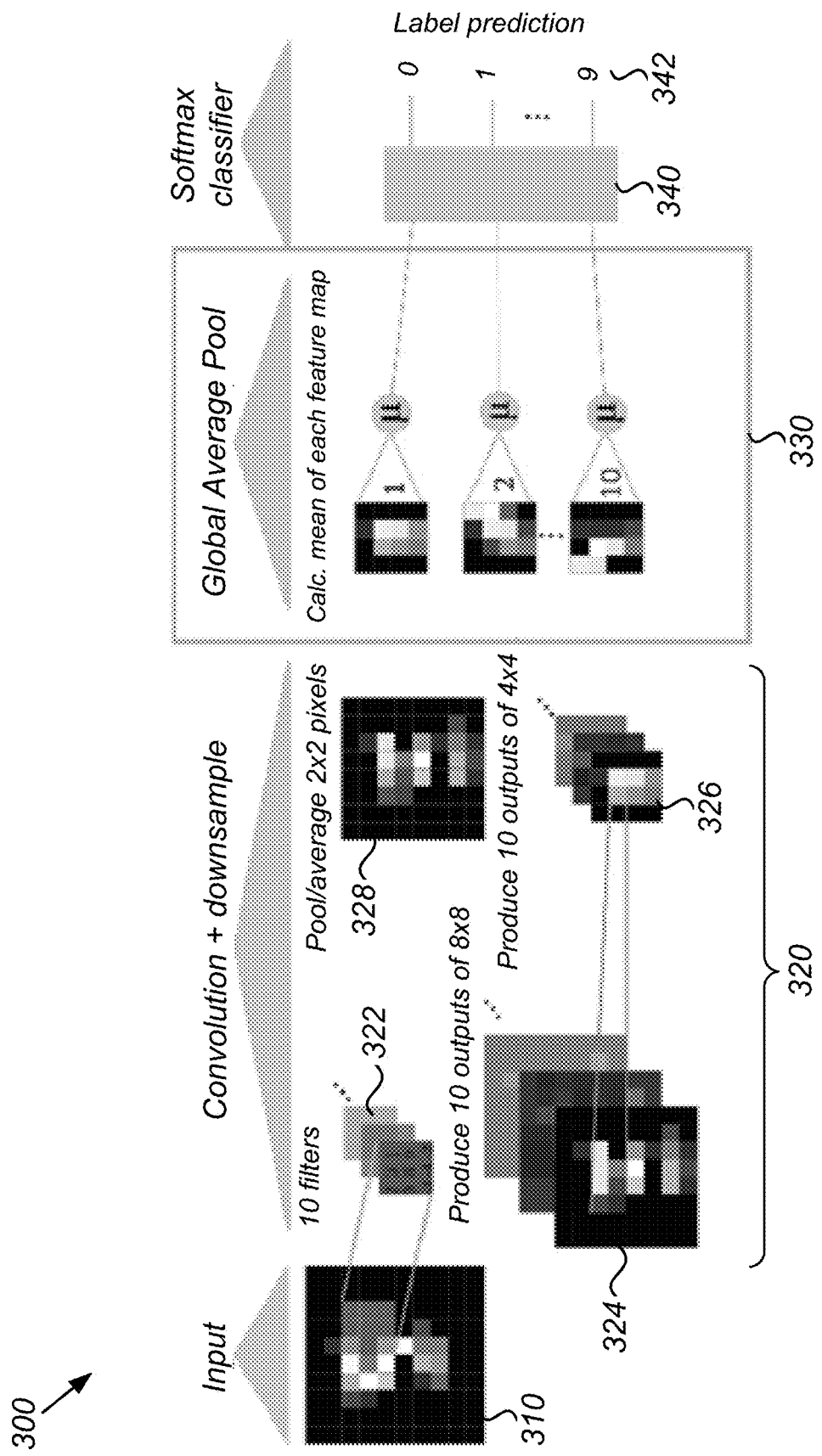
FIG. 4 shows a diagram illustrating an embodiment of the image processing process in accordance with the system and methods disclosed herein.

FIG. 4 shows a more detailed diagram 300 illustrating an embodiment of the image processing process shown in FIG. 3. The process starts at receiving an input 310. To illustrate the steps of the processing, an example input 310 is provided that represents an image of a single digit between 0 and 9. Input 310 is received by an input module that may perform traditional image processing, such as normalization or equalization, although not required. Input 310 may then move to the machine learning model 320, which in this illustration consists of convolutional filters and down sampling processes organized into layers of repeated application, with various layer configurations shown in FIG. 5.

For illustration purposes, the first layer 322 of the machine learning model 320 includes 10 filters, each with a 3×3 pixel filter size and thus 90 trainable model parameters. Each filter produces one feature map output 324 of 8×8 pixels. These feature maps are then input into a second layer 328 involving a down sampling operation that reduces each of the 10 feature maps to a 4×4 feature map 326. Additional layers of convolution are possible, but not described here.

These feature maps are input into the global average pool 330, where the mean is calculated of each feature map. The output of the global average pool 330 is directed to the classifier 340. At classifier 340, a label vector (see FIG. 6) is calculated for the input image, where each label vector element is the confidence value associated with a particular target type, or in this illustrative example, a digit (0-9) label. Furthermore, class activation maps (CAMs) are computed using the following equation:

$$M_c(x,y) = \Sigma_k w_k^c f_k(x,y) \qquad \text{(Eq. 1)}$$

where $M_c(x, y)$ is the CAM at pixel (x, y) for class c, $w_k^c$ is the softmax weight for filter k, class c, and $f_k$ is the activation of filter k at (x, y). The CAMs are computed for each label vector using the feature maps of the last convolutional layer and the classifier weights for the associated filters. This CAM may be up-sampled to match the input image size. The label vector and CAMs composed together produce the output 342, which may comprise the output 289 that is directed by controller 210 to be transmitted through transceiver 240 to vessel 130 via signal 132.

Figures 5, 6:
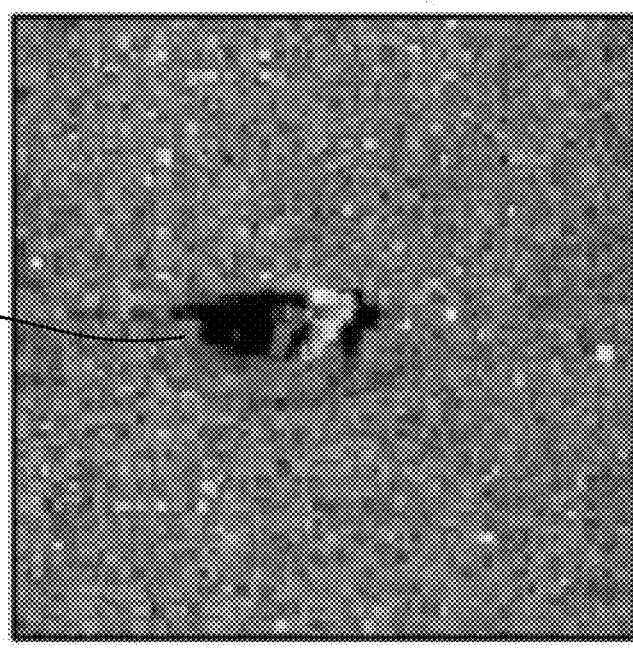
FIG. 5 shows a diagram illustrating potential configurations for the neural network used in accordance with the systems and methods disclosed herein.
FIG. 6 shows a diagram illustrating system output comprising a label vector and class activation map visualized as a colored heat map overlay of the input image.

FIG. 5 shows a diagram 400 illustrating potential configurations (L1-L9) for the CNN used in the systems disclosed herein, for the purpose of describing how to increase the size of the network for increased efficacy or reducing the size to enable use within computationally-constrained computer systems. For example, configuration L2 represents a CNN with two convolutional layers (c16), each with 16 filters, a global average pooling layer (gap), and a final classifier layer (fc2). Other configurations contain downsampling layers (max pool: mp), and more filters per convolutional layer (c64). Many other configurations are possible, with varying numbers of layers, layer types, and layer implementation options.

FIG. 6 shows a diagram illustrating system output 500. Output 500 includes the input image 510 having a class activation map (CAM) 512, illustrated as a colored "heatmap" over the input image, as well as a label vector 520, shown as confidence values for "not-mine" and "mine" (NM, M) for a landmine identification application. The "heat map" is the class activation map up-sampled to the input image size and thresholded for the sake of illustration. In some embodiments, the input image itself may not be considered part of the output, with just the CAM 512 and label vector 520 being shown.

The heatmap overlay of the input image in output 500 provides visual feedback to the user/supervising system as to what areas of the input image contribute to the system's classification decision. If desired, various processing can be performed by the system on output image 500, such as thresholding and normalization, to improve usability. Furthermore, the target location can be specified by latitude/longitude or other coordinate system by the controller 210 from the other data provided by, for example navigation/control 260 and image capture system 270 as shown in FIG. 2.

The training process described below may be applied to the disclosed systems and methods to provide a robust machine learning approach. An arbitrarily-sized image is taken as input, along with known locations (coordinate) for target objects. The disclosed methodology then may perform the following operations: (1) save a "target" example sub-image from the input located around the provided object coordinates; (2) select a number of other sub-images from the input that do not contain the provided object location; (3) save the "not-target" sub-images; (4) organize the dataset such that each "target" example sub-image has a corresponding "target" label, and each "not-target" sub-image has a "not-target" label. Given this dataset, the machine learning model is trained to correctly label input examples using methods appropriate for the details of the model. For example, the CNN described herein may be trained with stochastic gradient descent on mini-batches of examples, which determines all free parameters (weights) of the CNN via the backpropagation method.

Figure 7:
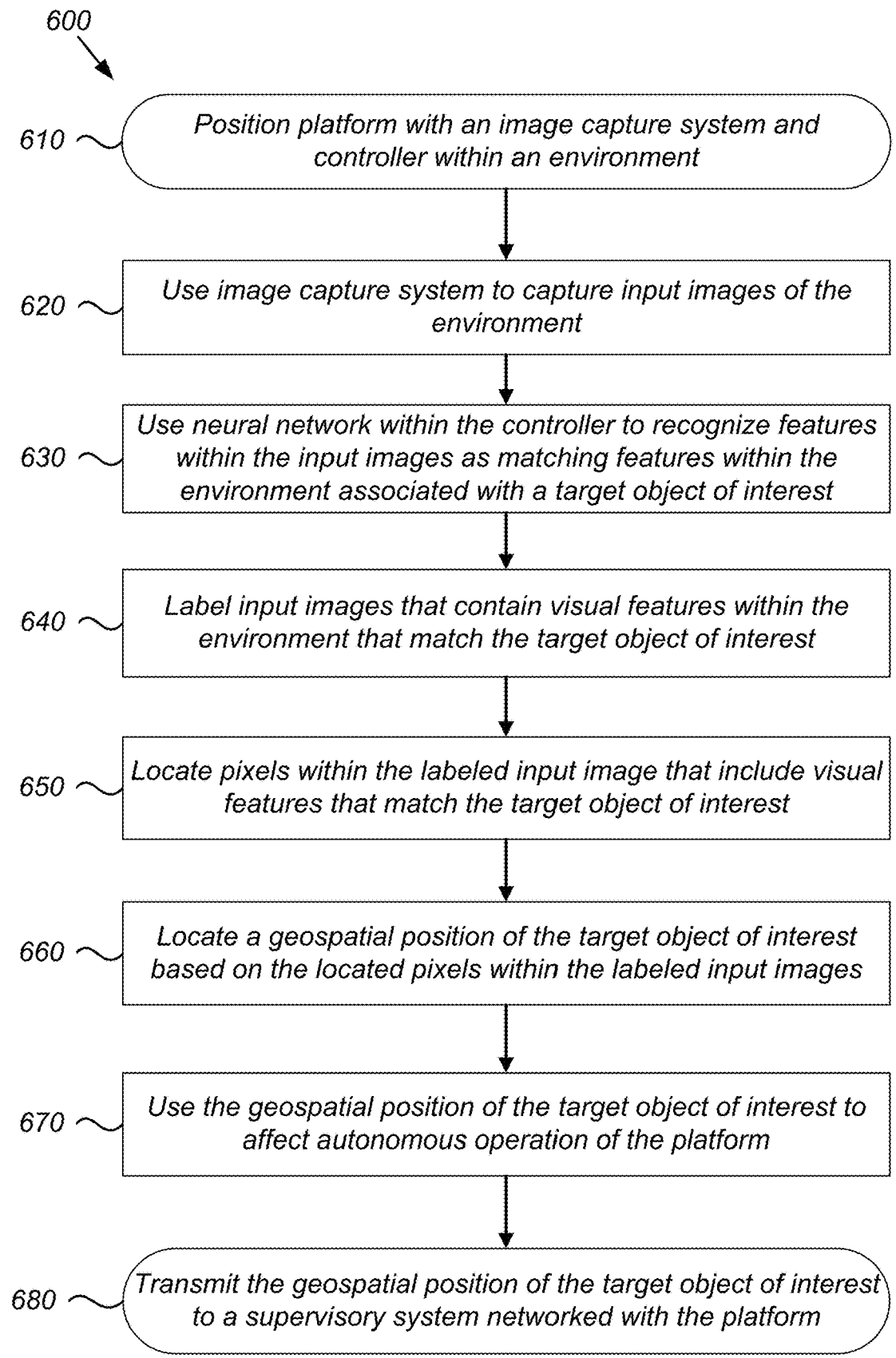
FIG. 7 shows a flowchart of an embodiment of a method in accordance with the systems and methods disclosed herein.

FIG. 7 shows a flowchart of an embodiment of a method in accordance with systems and methods disclosed herein. FIG. 7 shows one embodiment of method 600 to include steps 610-680, other embodiments of method 600 may contain fewer or more steps. Further, while in some embodiments the steps of method 600 may be performed as shown in FIG. 7, in other embodiments the steps may be performed in a different order, or certain steps may occur simultaneously with one or more other steps. For illustration purposes, method 600 will be discussed with reference to the systems/diagrams shown in FIGS. 1-6 herein.

Method 600 begins at step 610, which involves positioning a platform 110 within an environment 112, the platform 110 including an image capture system 270 connected to a controller 210, the controller 210 having a neural network (see references 320, 330, 340 of FIG. 4) implemented therein, the neural network trained to associate visual features within the environment 112 with a target object of interest utilizing a known set of input data examples and labels, as discussed above. Step 620 involves capturing, using the image capture system 270, one or more input images 510 from the environment 112. As an example, the images may be captured using a sonar system, camera, or sensor configured to capture images.

Step 630 involves recognizing, using the neural network, features of one or more of the input images that at least partially match one or more of the visual features within the environment associated with the target object of interest, commonly referred to as inference. In some embodiments, the neural network has previously been trained with a process that determines parameters of each layer of the neural network. In such embodiments, step 630 may comprise, for an input image to be labeled as containing a target object or not, calculating output values of each convolutional filter, down sampling, averaging, or other such processing layers, of the neural network, producing as output numerical values that indicate strength of match to learned visual features, referred to as feature maps.

Step 640 involves interpreting the numeric features of step 630 to derive one or more labels (see reference 520 in FIG. 6) for the input image 510, a process referred to as labeling or classification. In some embodiments, step 640 involves calculating the mean of each feature map (global average pool layer), calculating the output of a softmax classifier, and assigning a confidence value to a label of an input. As an example, the confidence value may be used as a threshold value in order to label the input image as either containing the target object of interest, or not containing the target object.

Step 650 involves locating, using the neural network, pixels within the labeled input images that comprise visual features within the environment 112 that at least partially match the target object of interest. In some embodiments, this is done via computing the class activation map (Eq. 1), whereby each pixel of the input is assigned a value representing its influence on the label given in step 640. These pixel values may be further used as label information for the input image in order to locate the object of interest within the input. In some embodiments, the class activation map is processed in various ways, such as normalizing (scale the CAM values such that the minimum is 0 and the maximum is 1.0) and thresholding (values below 0.5 are considered 0). In some embodiments, the class activation map has a heat map color overlay 512 on the input image 510.

Step 660 involves locating, using the controller 210, a geospatial position of the target object of interest based upon the located pixels within the labeled input images 500. In some embodiments, step 660 involves translating coordinates of pixels with a target object label to coordinates representing a geospatial location.

In some embodiments, method 600 continues to step 670, which involves using the geospatial position of the target object of interest to affect the autonomous operation of the vehicle via controller 210, including planning a new route towards the target. In some embodiments, method 670 continues to step 680, which involves transmitting the geospatial position of the target object of interest to a supervisory system 130 networked with the platform 110 (such as via signal 132 shown in FIG. 1).

In some embodiments, method 600 further includes the steps of assigning a label to each pixel of the input image that represents the target object of interest. In some embodiments, method 600 also includes the step of using the controller to generate a class activation map of the input image using the labels assigned to each pixel of the input image. In some embodiments, the class activation map has a heat map color overlay on the input image. In some embodiments, method 600 further includes the step of communicating the class activation map to a supervisory system networked with the platform. In some embodiments, method 600 also includes the steps of processing the class activation map's values to yield modified values that reflect the goal of the controller, with a specific form of processing being to normalize and threshold the class activation map's values to provide the target object's location, and communicating the processed class activation map's values to a supervisory system networked with the platform.

Method 600 may be implemented as a series of modules, either functioning alone or in concert, with physical electronic and computer hardware devices. Method 600 may be computer-implemented as a program product comprising a plurality of such modules, which may be displayed for a user.

Various storage media, such as magnetic computer disks, optical disks, and electronic memories, as well as non-transitory computer-readable storage media and computer program products, can be prepared that can contain information that can direct a device, such as a micro-controller, to implement the above-described systems and/or methods. Once an appropriate device has access to the information and programs contained on the storage media, the storage media can provide the information and programs to the device, enabling the device to perform the above-described systems and/or methods.

For example, if a computer disk containing appropriate materials, such as a source file, an object file, or an executable file, were provided to a computer, the computer could receive the information, appropriately configure itself and perform the functions of the various systems and methods outlined in the diagrams and flowcharts above to implement the various functions. That is, the computer could receive various portions of information from the disk relating to different elements of the above-described systems and/or methods, implement the individual systems and/or methods, and coordinate the functions of the individual systems and/or methods.

Many modifications and variations of the embodiments disclosed herein are possible in light of the above description. Within the scope of the appended claims, the disclosed embodiments may be practiced otherwise than as specifically described. Further, the scope of the claims is not limited to the implementations and embodiments disclosed herein, but extends to other implementations and embodiments as may be contemplated by those having ordinary skill in the art.

We claim:

1. A method comprising the steps of:
positioning a platform within an underwater environment, the platform including a sonar capture system connected to a controller, the controller having a neural network implemented therein, the neural network trained to associate one or more visual features within the underwater environment with a target object of interest utilizing a known set of input data examples and labels using the following operations:
1) Save a target example sub-image from input located around an object coordinates;
2) Select other sub-images from the input that do not contain the object coordinates;
3) Save the other sub-images as not-target sub-images;
4) Organize a dataset to label the target example sub-image with a target label and the not-target sub-images with a not-target label;
capturing, using the sonar capture system, one or more input images from the underwater environment;
recognizing, using calculated output values of at least one convolutional filter of the neural network, features of the one or more input images that at least partially match the one or more of the visual features within the underwater environment with the target object of interest;
calculating, using a classifier of the neural network, a label vector for the one or more input images where the label vector is a confidence value associated with the target object of interest;
labeling, using the confidence value from the classifier of the neural network, the one or more input images that at least partially match the one or more visual features within the underwater environment that at least partially match the target object of interest;
locating, using a combined label vector and class activation map output of the neural network, pixels within the one or more input images that at least partially match one or more visual features within the underwater environment that at least partially match the target object of interest; and
locating, using the controller, a geospatial position of the target object of interest based upon the pixels within the one or more input images.

2. The method of claim 1, wherein the confidence value is determined to categorize the input image as containing the target object of interest.

3. The method of claim 1 further comprising the step of assigning a label to each pixel of the input image that represents the target object of interest.

4. The method of claim 3, further comprising the step of using the controller to generate a class activation map of the input image using the labels assigned to each pixel of the input image.

5. The method of claim 4 further comprising the step of communicating the class activation map to a supervisory system networked with the platform.

6. The method of claim 4 further comprising the steps of:
processing values of the class activation map to yield modified values that reflect a goal of the controller, wherein the processing includes normalizing and thresholding the values of the class activation map to provide the geospatial position of the target object of interest; and
communicating the processed values of the class activation map to a supervisory system networked with the platform.

7. The method of claim 4, wherein the class activation map has a heat map color overlay on the input image.

8. The method of claim 1, wherein the step of locating the geospatial position of the target object of interest comprises translating coordinates of pixels with a target object label to coordinates representing a geospatial location.

9. The method of claim 1 further comprising the step of using the geospatial position of the target object of interest to guide decisions of the controller.

10. The method of claim 1 further comprising the step of transmitting the geospatial position of the target object of interest to a supervisory system networked with the platform.

11. A system comprising:
a platform positioned within an underwater environment, the platform including a sonar capture system connected to a controller, the controller having a neural network implemented therein, the neural network trained to associate one or more visual features within the underwater environment with a target object of interest utilizing a known set of input data examples and labels using the following operations:
  1) Save a target example sub-image from input located around an object coordinates;
  2) Select other sub-images from the input that do not contain the object coordinates;
  3) Save the other sub-images as not-target sub-images;
  4) Organize a dataset to label the target example sub-image with a target label and the not-target sub-images with a not-target label;
wherein the controller is configured to cause the sonar capture system to capture one or more input images from the underwater environment;
wherein the controller is configured to use calculated output values of at least one convolutional filter of the neural network to recognize features of one or more of the input images that at least partially match one or more of the visual features within the underwater environment with the target object of interest;
wherein the controller is configured to use a classifier of the neural network to calculate a label vector for the one or more input images where the label vector is a confidence value associated with the target object of interest;
wherein the controller is configured to label, using the confidence value from the classifier of the neural network, the one or more input images that at least partially match the one or more visual features within the underwater environment that at least partially match the target object of interest;
wherein the controller is configured to locate, using a combined label vector and class activation map output of the neural network, pixels within the one or more input images that at least partially match the one or more visual features within the underwater environment that at least partially match the target object of interest; and
wherein the controller is configured to locate a geospatial position of the target object of interest based upon the pixels within the one or more input images.

* * * * *